United States Patent [19]

Sheridon

[11] Patent Number: 5,659,330
[45] Date of Patent: Aug. 19, 1997

[54] ELECTROCAPILLARY COLOR DISPLAY SHEET

[75] Inventor: Nicholas K. Sheridon, Los Altos, Calif.

[73] Assignee: Xerox Corporation, Stamford, Conn.

[21] Appl. No.: 656,467

[22] Filed: May 31, 1996

[51] Int. Cl.$^6$ .............................................. G09G 3/34
[52] U.S. Cl. .............................................. 345/84; 345/107
[58] Field of Search .............................. 345/84, 85, 30, 345/107, 48, 55; 359/290, 291, 228

[56] References Cited

U.S. PATENT DOCUMENTS

| | | | |
|---|---|---|---|
| 4,023,969 | 5/1977 | Sheridon | 346/77 R |
| 4,126,854 | 11/1978 | Sheridon | 345/107 |
| 4,583,824 | 4/1986 | Lea | 359/291 |
| 5,389,945 | 2/1995 | Sheridon | 345/107 |

Primary Examiner—Doon Chow
Attorney, Agent, or Firm—Fariba Rad

[57] ABSTRACT

An electrocapillary color display sheet is disclosed which utilizes a plurality of sets of different color droplets between two sheets in which each set of droplets will create a pixel of an image. Each set of droplets has at least two droplets in which each droplet has a different color. On one of the sheets there is a first type electrode for each set of droplets. Each first type electrode has at least two holes and each hole holds one second type electrode. Each second type electrode corresponds to one droplet of the corresponding set of droplets. There is also an addressable electrical connection to each droplet. By selectively activating droplets of each set of droplets and its corresponding first type electrode and second type electrode, at least one of the droplets of the set will expand in a space commonly shared by the droplets of each set to create a colored pixel.

2 Claims, 9 Drawing Sheets

ELECTROCAPILLARY COLOR DISPLAY SHEET

BACKGROUND OF THE INVENTION

This application relates to U.S. patent application Ser. No. 08/581137, "Electrocapillary Display Sheet" and U.S. patent application Ser. No. 08/643,678 "Electrocapillary Color Display Sheet" (All Common Assignee).

This invention relates to an electrocapillary color display sheet and more particularly concerns an electrocapillary color display sheet which utilizes a plurality of sets of droplets of dyed polar liquid in between two transparent sheets. By selectively applying an electric field directly to each droplet of each set, each droplet in each set of droplets can be selectively expanded to occupy a space in a size of a pixel in order to create a colored pixel of an image.

The suggested display devices, in sheet form, comprise a thin sheet which has many attributes of a paper document. It looks like paper, has ambient light valve behavior like paper (i.e. the brighter the ambient light, the more easily it may be seen), is flexible like paper, can be carried around like paper, can be written on like paper, can be copied like paper, and has nearly the archival memory of paper.

There have been different approaches to make an electronic display sheet such as U.S. Pat. No. 4,126,854 titled "Twisting Ball Panel Display" in which the display panel is comprised of a plurality of spherical particles which have different colors on each hemisphere. Depending on the direction of an electric field applied to each spherical particle, one of the hemispheres will be displayed. In this approach, for a black and white display sheet, each ball has a black hemisphere and a white hemisphere. The black and white hemispheres of the spherical particles can be selected in such a manner to display a desired image or text.

It is an object of this invention to provide a different approach to make an electronic color display sheet.

SUMMARY OF THE INVENTION

An electrocapillary color display sheet is disclosed which utilizes two sheets which are spaced apart from each other to create a space between them. One of the sheets has a plurality of first type electrode means. Each one of the plurality of electrodes has at least two holes. Each hole holds a second type electrode. A plurality of sets of at least two droplets are located in the space between the two sheets and each one is located over one of the second type electrodes. Each set of droplets corresponds to a first type electrode and each droplet has a different color. Each droplet has an individual electrical connection. By selectively activating a droplet, a corresponding first electrode and a corresponding second electrode, the droplet expands and creates a colored pixel.

DETAILED DESCRIPTION OF THE INVENTION

Figure 1:
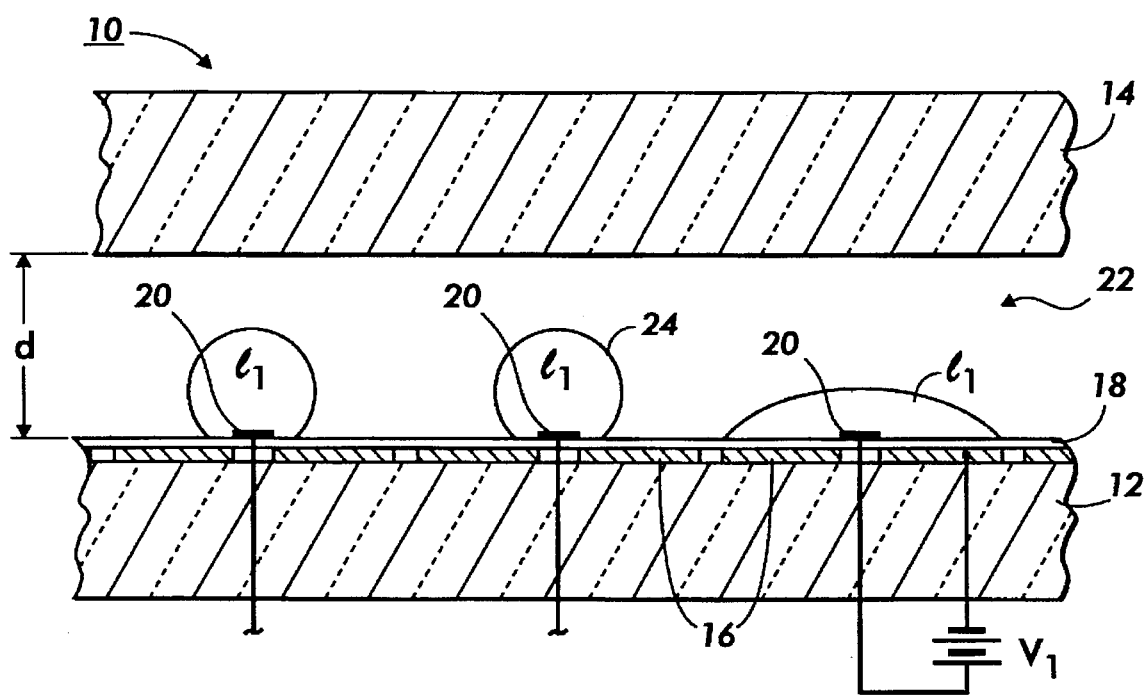
FIG. 1 shows a magnified portion of a cross sectional view of a black and white electrocapillary display sheet of this invention.

Referring to FIG. 1, there is shown a magnified portion of a cross sectional view of an electrocapillary display sheet 10 of this invention. The electrocapillary display sheet 10 comprises a substrate 12 and a transparent sheet 14. Substrate 12 and sheet 14 are substantially parallel to each other and they are spaced from each other.

A plurality of square, transparent, conductive electrodes 16 are placed over the substrate 12. The substrate can be made of materials such as glass, Teflon, polycarbonate and acrylic and electrodes can be made of materials such as gold, platinum, stainless steel, nickel, silver and indium/tin oxide. The electrodes 16, can have different shapes such as a circle or a square. In the preferred embodiment of this invention, the electrodes 16 are designed to have a square shape. Each electrode 16 has an area substantially equal to an area of a pixel of an image. Over the substrate 12 and the electrodes 16 there is a layer of low surface energy insulator 18. A plurality of high surface energy plates 20 are placed over the low surface energy insulator 18. Each one of the high surface energy plates 20 is aligned to be above the electrodes 16. The low surface energy insulator 18 insulates the electrodes 16 from the high surface energy plates 20.

The low surface energy insulator 18 may be a layer of Teflon (DuPont Co.) or other perfluorinated polymer, bonded to the surface as a sheet or deposited by a sputtering or chemical vapor deposition process. It may also be a silicone elastomer such as Sylgard 184 manufactured by the Dow Coming Co. It may also be a two or more layer structure such as Parylene (a product of the Union Carbide Co.) overcoated with a perfluorinated polymer such as Fluorad FC725 manufactured by the 3M Co. The high surface energy plates 20 are made from a material such as evaporated or sputtered gold, platinum, indium/tin oxide, or nickel.

Figure 2:
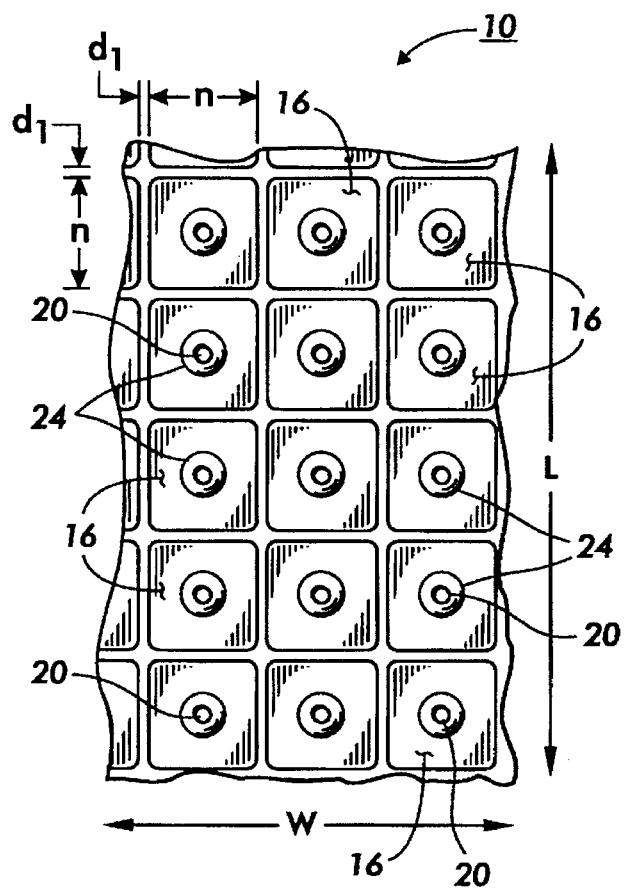
FIG. 2 shows a top view of the electrocapillary display sheet of FIG. 1.

Referring to FIG. 2, there is shown a top view of the electrocapillary display sheet 10. The electrodes 16 of sheet 10 are placed next to each other in such a manner that they form parallel lines both along the width W and the length L of the surface of sheet 10. The electrodes 16, of dimension n by n, are placed at a distance $d_1$ away from each other.

Since each electrode has the same size as the size of a pixel, the dimension n is defined by the size of the pixels. Distance $d_1$ is in the range between 0.001 n and 0.05 n.

It should be noted that the electrodes 16 and the low surface energy insulator 18 are transparent. The high surface energy electrodes 20 may also be transparent.

Referring back to FIG. 1, a plurality of droplets 24 of a dyed or pigmented liquid 11 are placed over the high surface energy plates 20 in such a manner that each droplet covers one high surface energy plate 20. Each one of the high surface energy plates 20, which individually is addressable, provides an electrical connection to one of the droplets 24. Furthermore, the high surface energy plates 20 also tend to adhere droplet 24 to substrate 12 by reason of the fact that the droplet liquid wets them. Since the high surface energy plates 20 provide the electrical connections to the droplets 24, hereinafter, the "high surface energy plate" is referred to as the "connection plate".

Once, the electrodes 16, low surface energy insulator 18, the connection plates 20 and the droplets 24 are placed on the substrate 12, sheet 14 will be bonded to the substrate 12.

Figure 3:
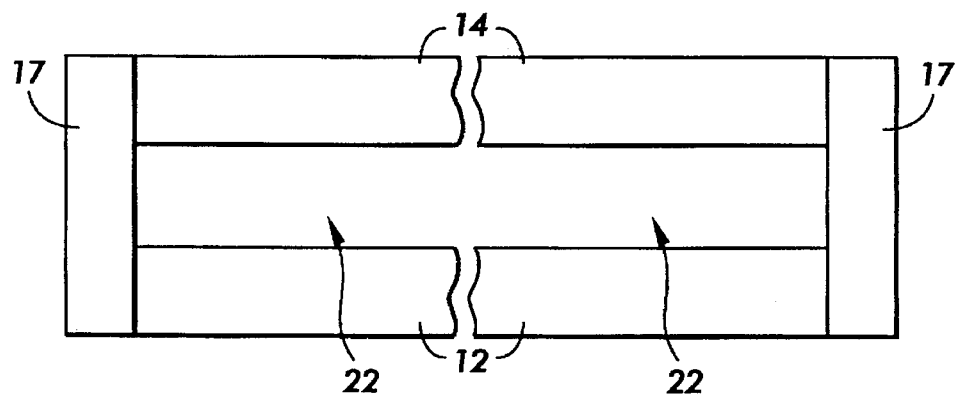
FIG. 3 shows an example of a method of bonding the substrate 12 and sheet 14 of FIG. 1 together.

Referring to FIG. 3, there is shown an example of a method of bonding the substrate 12 and the sheet 14 together. The substrate 12 and the sheet 14 are suitably spaced from each other and bonded to a frame 17 that runs around the periphery of the display sheet 10. If the frame 17 and the substrate 12 and the sheet 14 are glass, bonding might be done by means of a glass frit painted onto joining surfaces and subsequently heated to its melting temperature. The bonding might also be done with epoxy or some other bonding resin. If the substrate 12 and the sheet 14 are all made of a plastic material, such as Teflon or mylar, the bonding might be a heat weld, accomplished by means well known in the art. Once the substrate 12 is bonded to sheet 14, the space 13 between the substrate 12 and the sheet 14 becomes a sealed space 22. Space 22 has to be at least larger than the maximum height of the droplets 24.

Referring back to FIG. 1, the remaining portion of the sealed space 22 which is not occupied by the droplets 24 is filled with air or may be filled with a low surface energy liquid $l_2$ such as Dow Corning 200 Series silicone oil, Exxon Isopar or 3M Fluorinert. The droplets 24 of liquid $l_1$ are made from a dyed polar liquid such as water, alcohol, acetone, formamide, ethylene glycol and mixtures of these and other suitable liquids. The droplets 24 of liquid $l_2$ and the liquid $l_2$ are immiscible.

This invention is based on a concept called "electrocapillarity". This relates changes in surface tension to electric fields and is discussed in 'Surface Chemistry', by Lloyd I. Osipow, 1962, Reinhold Publishing Co., New York". The structure shown in FIG. 1 is designed to spread the droplet of the liquid or contract the droplet of the liquid using effects related to the electrocapillary concept. In order to comprehend the disclosed embodiment of this invention, it is necessary to study the electrocapillary concept.

Figure 4:
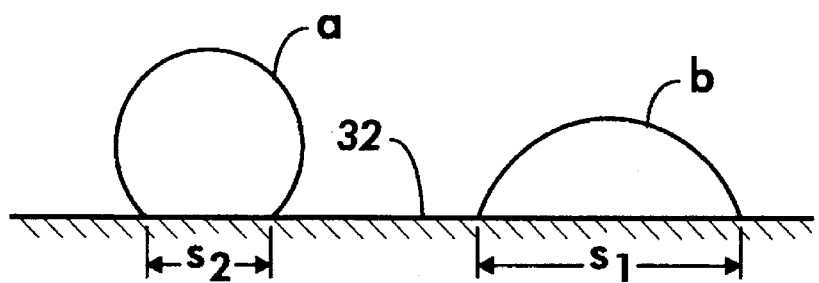
FIG. 4 shows two same size droplets of two different kinds of liquid on a surface.

Referring to FIG. 4, there are shown two same size droplets a and b of two different kinds of liquid on a surface 32. As it can be observed, droplet b is spread out and droplet a is beaded up. As a result, droplet b occupies a larger surface area $S_1$ than the surface area $S_2$ which the droplet a occupies. The reason for the different surface areas of the two liquids is that each liquid has a certain energy relationship with the surface which results in a specific contact angle with respect to a given surface. The lower the interaction energy between the liquid and the surface, the larger the contact angle and the less the shared area.

Figure 5:
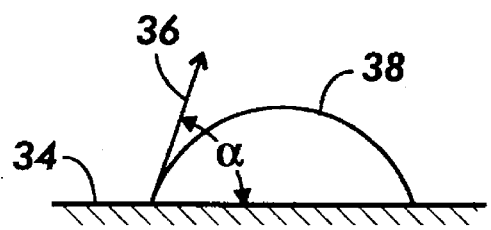
FIG. 5 shows a contact angle which is an angle between the tangent line of a droplet of a liquid and the contact surface.

Referring to FIG. 5, a contact angle $\alpha$ is an angle between the surface 34 and the tangent line 36 of a droplet 38 of a liquid. The contact angle $\alpha$ of each liquid with respect to a given surface depends on the properties of that liquid (e.g. surface tension) and the properties of the surface (e.g. surface energy).

Figure 6:
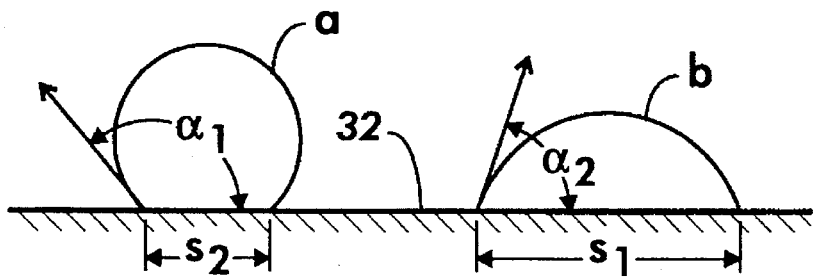
FIG. 6 shows the two droplets of FIG. 4 with their contact angles.

Referring to FIG. 6, there are shown the two droplets a and b of FIG. 4 with their contact angles $\alpha_1$ and $\alpha_2$. Some liquids, such as the liquid of droplet b, have an acute contact angle $\alpha_2$ which causes the droplet of that liquid to occupy a large surface $S_1$. However, some liquids such as the liquid of droplet a have an obtuse contact angle $\alpha_1$ which causes a same size droplet of one of these liquids to occupy a much smaller surface area $S_2$ than the surface area $S_1$ occupied by liquids with acute contact angles.

Figure 7:
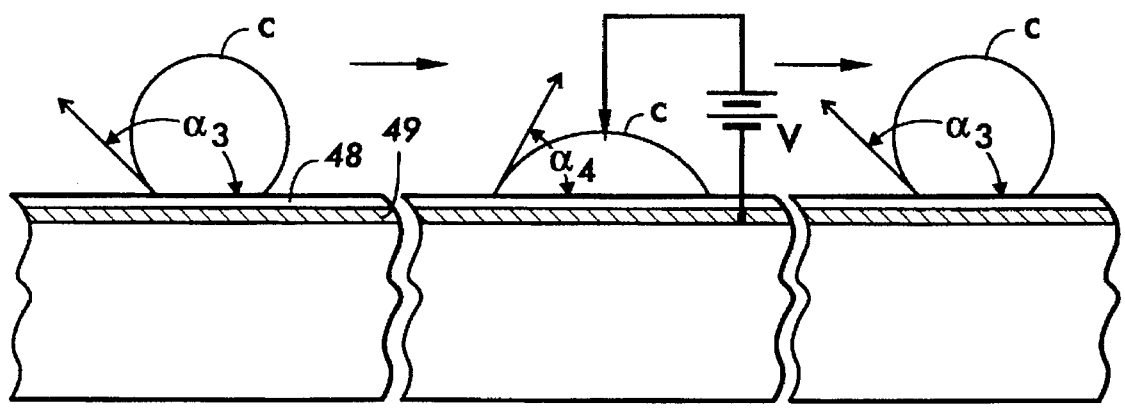
FIG. 7 shows three stages of a droplet prior to applying an electric field, during application of an electric field and after removing the electric field.

Furthermore, referring to FIG. 7, through extensive experiments it has been determined that by applying a voltage V between a droplet c located on a thin insulative surface 48 with an electrode 49 directly under the surface 48 an electric field is created which causes the contact angle to be changed. Depending on the voltage applied to the liquid, the contact angle can be modified to a desired angle.

In FIG. 7, form left to right, droplet c is shown prior to applying a voltage V, during application of the voltage V and after removal of the voltage V. As can be observed, prior to applying voltage V the droplet c is beaded up and has an obtuse angle $\alpha_3$. During the application of the voltage V, the contact angle of droplet c changes to an acute angle $\alpha_4$ and as a result, the droplet expands. After removal of the voltage V, the contact angle of the droplet changes to its original obtuse angle $\alpha_3$ and as a result, the droplet beads up again.

It should be noted that if the voltage is turned off, the charges remain in the droplet and the electrodes, as a result, the droplet will remain spread. However, if the droplet and the electrodes are discharged, then the liquid will bead up. In this specification the term "electric field is removed" shall mean "the droplets and electrodes are discharged". Furthermore, in this specification, "activating a droplet" shall mean "applying a voltage to a droplet through a connection plate" and deactivating a droplet shall mean "removing a voltage which was applied to a droplet through a connection plate".

Modifying a contact angle from an obtuse angle to an acute angle causes the droplet to occupy a larger surface area than the original surface area (the surface that a droplet occupies prior to the application of a voltage V). Once the voltage V is removed, the droplet will contract back to its original surface area. The experiments have shown that by applying a voltage V to liquids such as water and mercury on a surface such as silicone elastomer overcoated onto a conductive substrate, their surface areas can increase by more than a factor of 10. Furthermore, by utilizing surfaces such as Teflon coated Parylene, the surface areas of water or mercury can increase by a factor in the range between 20 and 30.

The concept of increasing a surface area of a liquid by applying a voltage has been used in this invention to expand the surface area of a dyed or pigmented liquid in order to fill a surface area on demand.

Referring back to FIG. 1, in the preferred embodiment of this invention, the contact angle of the dyed or pigmented droplet 24 with respect to the low surface energy insulator 18 is selected to be more than 90 degrees. It is well known that the contact angle of a liquid such as liquid $l_1$ with respect to a surface is greatly enhanced if a second liquid such as liquid $l_2$, with a lower surface tension (and immiscible with $l_1$) is present. This is shown in FIGS. 8 and 9.

Figure 8:
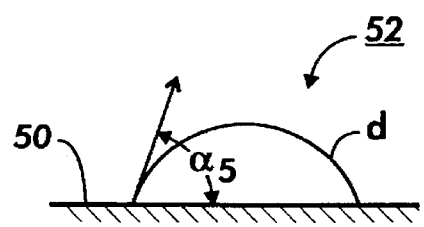
FIG. 8 shows a droplet which is surrounded by air and has an acute contact angle.
Figure 9:
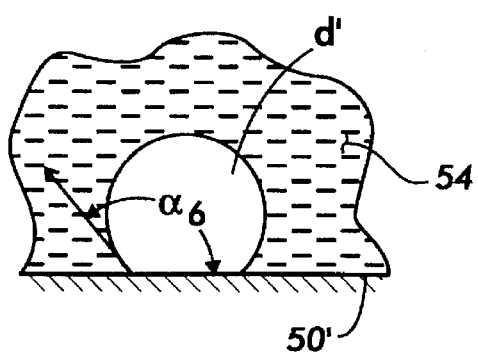
FIG. 9 shows the droplet of FIG. 8 surrounded by liquid and at the presence of the liquid, the droplet of FIG. 8 has an acute angle.

In FIG. 8, a droplet d of a liquid is placed on surface 50. The droplet d which is surrounded by air 52 has an acute contact angle $\alpha_5$. However, in FIG. 9, droplet d' which is the same as the droplet d of FIG. 8 is surrounded by a different liquid 54 and placed on the surface 50' which is the same as surface 50 of FIG. 8. In FIG. 9, as can be observed, liquid 54 has caused the droplet d' to have an obtuse angle $\alpha_6$. This effect can be utilized to greatly increase the number of useful polar liquid/low energy surface combinations which is very useful in the practice of this invention.

Referring back to FIG. 1, in operation, an individually addressable voltage $V_1$ is applied to each droplet 24 (through the connection plate 20) and its corresponding electrode 16. For the purpose of simplicity, only the connection of voltage $V_1$ to one droplet 24 and its corresponding voltage $V_1$ is shown. The voltage $V_1$ can be either AC or DC. In the case of the DC voltage, electrode 16 is connected to one polarity of the voltage $V_1$ and the opposite polarity of the voltage $V_1$ is connected to the connection plates 20. Since the connection plates 20 provide electrical connection to the droplets 24, the droplets 24 have the opposite potential compared to the potential of the electrodes 16.

Once the voltage $V_1$ is turned on, the opposite polarity of droplets 24 with respect to the polarity of the electrodes 16 directly under the low surface energy insulators 18 causes the contact angle of the droplet 24 to decrease. As a result, once the voltage $V_1$ is activated, the corresponding droplet 24 will spread out and occupy a larger surface area.

It should be noted that in the preferred embodiment of this invention, electrodes 16 have an opening 19 to provide a path for the connection form the voltage source generating the voltage $V_1$ to the connection plates 20. However, it is not necessary to have an opening in electrodes 16. The voltage source generating the voltage $V_1$ can be connected to the connection plates 20 through any desired path. It should also be noted that depending on the desired path, the connections to the connection plate 20 might need to be transparent.

In the preferred embodiment of this invention, the droplets 24 are selected from a liquid which has a contact angle of more than 90 degrees with respect to the low surface energy insulator 18. Also, in the preferred embodiment of this invention, the low surface energy insulator 18 is selected to be a Parylene C film of approximately 0.2 micron thickness overcoated by an FC723 film of approximately 0.3 microns thickness. Therefore, by applying an electric voltage in the range of 30 to 40 volts to a droplet of the preferred embodiment of this invention, the droplet will spread out to occupy a surface area as large as 20 times its original surface area. Upon removal of the voltage $V_1$, the droplet 24 beads up to its original shape and occupies a smaller surface area than when it was spread.

The mount of liquid in each droplet is selected in such a manner that when the surface area of one droplet 24 expands to 20 times as original area, then it will occupy an area which is equal to an area of a pixel of an image. Assuming that the dyed or pigmented liquid is black, then after the droplet spreads out, it will create a black pixel. However, it should be noted that when the electric field created (electrodes activated) by an applied voltage is removed and the droplet returns back to its original shape, since the original surface area is much smaller (20 times) than the surface area of a pixel, the droplet in its original shape is not as visible as when it is spread out. Therefore, since each electric field can be addressed individually, by activating and deactivating the proper electric fields, an image can be displayed on the electrocapillary display sheet 10.

It should be noted that the sizes of the electrodes 16 compared to the sizes of droplets 24 are not dram to the scale.

It is highly desirable that the liquids $l_1$ and $l_2$ have the same or nearly the same specific gravity. This will provide a significant immunity to damage from mechanical shock. Still further immunity from mechanical shock can be obtained by partially encapsulating each droplet.

Figure 10:
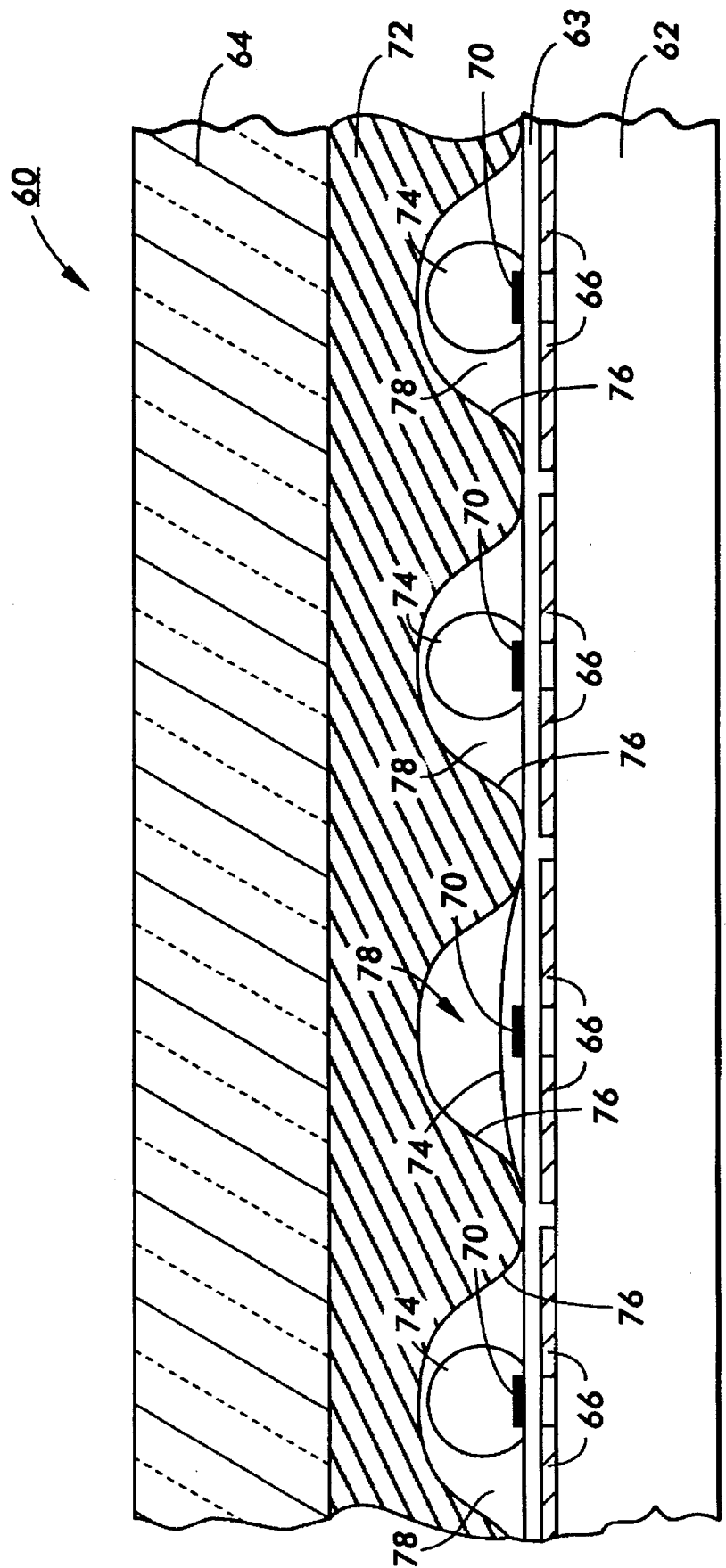
FIG. 10 shows an alternative black and white electrocapillary display sheet of this invention.

Referring to FIG. 10, there is shown an alternative electrocapillary display of this invention. In FIG. 10, all the elements 62, 64, 66, 68, 70, 72 and 74 are the same and serve the same purpose as the elements 12, 14, 16, 18, 20, 22 and 24 of FIG. 1 respectively. In FIG. 10 a rigid or semi-rigid, dielectric, transparent, pigmented or dyed structure 73, is placed in the space 22 of FIG. 1. The structure 73 has a plurality of cavities 76. Each cavity 76 accommodates one droplet 74. The cavities 76 also accommodate the changes of the droplet shape caused by the application of a voltage.

The rigid structure 73 can be injection molded or otherwise fabricated from clear plastics, such as acrylics or polycarbonates. It can be cast from epoxies or other resins and it should have a surface that the conductive droplet 74 does not readily adhere to, in case the droplets 74 strike said structure during severe mechanical shock. The structure 73 may also be fabricated from a silicone elastomer, such as Dow Coming Sylgard 184. In this latter case, the droplets 74 are first put in place and the remaining space 78 which is not occupied by the droplets 74 is filled with the uncurled elastomer, to which has been added a curing agent. As the elastomer cures, a cyclical voltage is applied between the conductive droplets 74 and the electrodes 66, causing cyclical deformation of the droplets 74. This localized motion of the elastomer will prevent the portion of elastomer close to the droplets from curing, whereas the rest of the elastomer will cure. In this manner cavities can be created around the droplets, and these cavities will be filled with a dielectric fluid. It should be note that the structure 73 has to be transparent if the display is viewed through sheet 64.

Within the cavities 76, space 78 around the droplets 74 can be filled with a non-conducting, dyed, transparent liquid $l_3$. The electrocapillary display sheet 10 of this invention can be utilized as a transparent display to be placed on a projector to project the image of the electrocapillary display sheet 10 onto a screen. Therefore, on the screen only the projected image of the droplets that are spread out will be seen as dark pixels or subpixels depending on the size of the electrodes and since the light passes through the pixels when their droplets are not spread out a bright spot will be created on the screen.

If a sheet of white paper were placed adjacent to the surface of the sheet not used for viewing, then it becomes a paper-like display, if a dark dye or pigment were used in the droplet liquid.

The display sheets 10 and 60 require a constant application of the pattern of addressing voltages (the voltages applied to electrodes 16 and the connection plates 20 of FIG. 10 and to electrodes 66 and connection plates 70 of FIG. 10) to continue to display an image. An active matrix addressing circuit could provide such a retained voltage pattern.

However, experimentally, if a voltage is applied to a droplet as shown in FIG. 7, and the voltage source is removed abruptly, the capacitively stored charge in the droplet 74 and the electrode 66 will retain the voltage deformed droplet shape for long periods of time, until the charge is discharged.

In FIG. 1, one approach to create a storage mechanism which does not depend upon the use of a continued electric field or stored charge is using a thixotropic liquid for 12. Such a liquid has a high viscosity under rest conditions and a very low viscosity under dynamic shear conditions. Thus, the substantial forces suddenly present on the droplet when it is addressed would drop the viscosity of liquid $l_2$ in the vicinity of the droplet, allowing substantially full expansion of the liquid $l_1$ over the electrodes 16. The voltage supplied by the addressing circuit can be caused to diminish slowly, allowing the liquid $l_2$ in the droplet vicinity to return to its high viscosity state and effectively holding the droplet in its extended state indefinitely. Erasure would be by means of an oscillating electric field of perhaps higher voltage than the addressing voltage. This would cause a short term drop in the viscosity of the liquid by inducing vibrations in the droplets For some applications of such a display it is desirable to be able to write directly on the display with a stylus, in much the manner that paper can be written on with a pen or pencil.

Figure 11:
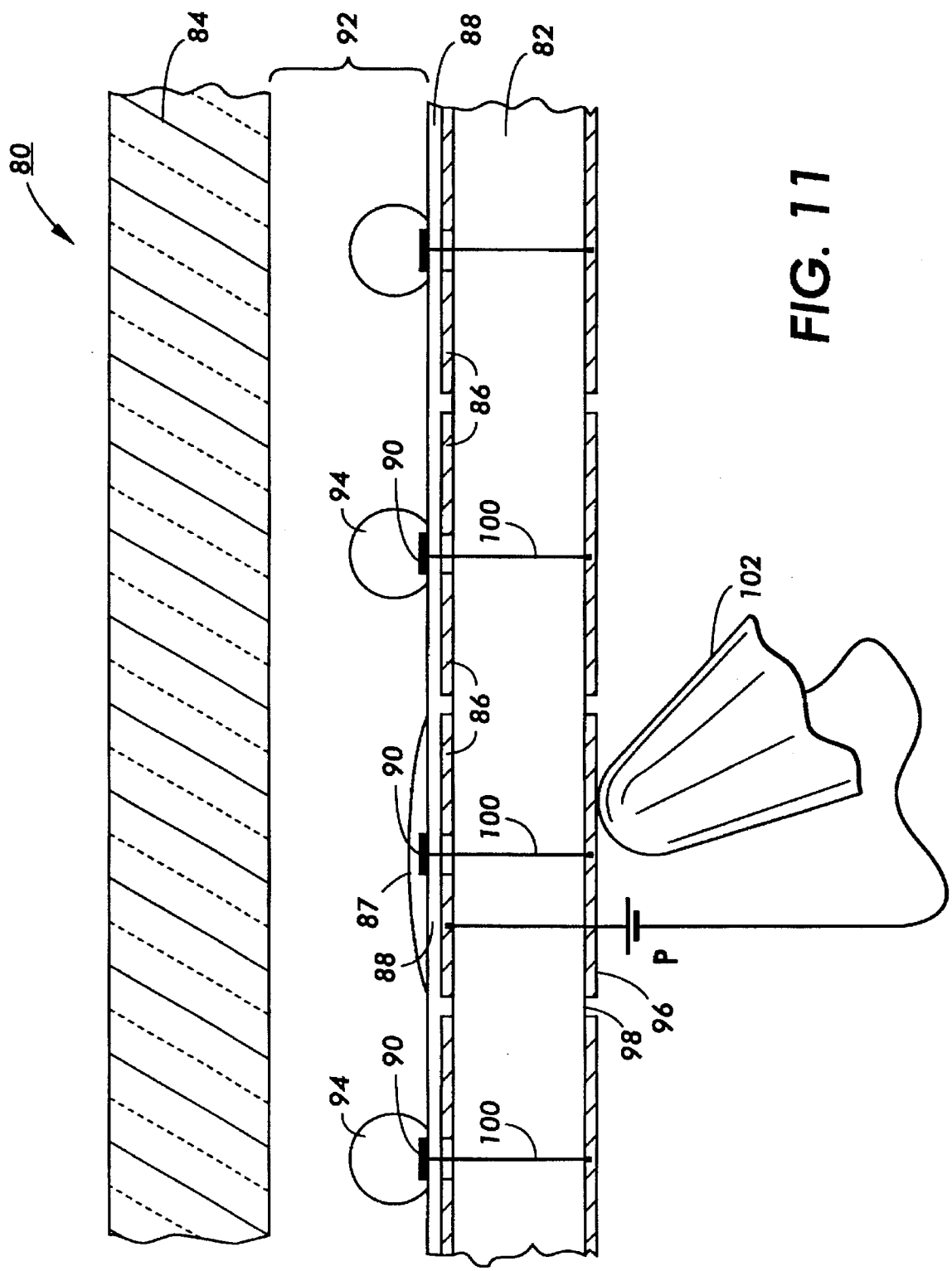
FIG. 11 shows an electrocapillary display sheet which is designed to be used with a stylus.

Referring to FIG. 11, there is shown a electrocapillary display sheet which is designed to be used with a stylus. In FIG. 11, the elements 82, 84, 86, 88, 90, 92 and 94 are the same and serve the same purpose as the elements 12, 14, 16, 18, 20, 22 and 24 of FIG. 1 respectively. In FIG. 1, a plurality of conductive plates 96 are placed on surface 98 of the substrate 82. Each one of the conductive plates 96 has an electrical connection 100 to the connection plates 90. Each one of the electrical connections 100 can be metallic in the manner of the pin plate that is used with cathode ray tube addressed electrostatic writing means, or it can be a conductive plastic.

The electrical connections 100 transfer charge from the plates 96 to the connection plates 90 and finally to the droplets 94. All the electrodes 86 are connected to one terminal of a power supply P, such as a battery, and the other terminal of the power supply P is connected to the conductive tip of a stylus 102. The conductive plates 96 has to be transparent. For the purpose of simplicity only the connection of one electrode 86 to the power supply P is shown.

In operation, as the stylus 102 moves across the bottom surface 98, the charge at the tip of the stylus 102 which is opposite to the charge of the electrodes 86 will be transferred through the electrical connections 100 into the connection plates 90. The opposite polarity of the charges of the droplets 94 and the electrodes 86 will cause the droplets 94 to expand and cover the surface 87 directly above the electrodes 86. Depending on the voltage of the power supply, the droplets 94 can expend to cover the entire area directly above the electrodes 86 or they can expend less to partially cover the area directly above the electrodes 86. Therefore, by selecting a proper voltage from the power supply, a gray scale can be created.

In the electrocapillary display sheet, the image will be retained by the capacitively stored charge, or other means such as thixotropic liquid in the space 92.

Figure 12:
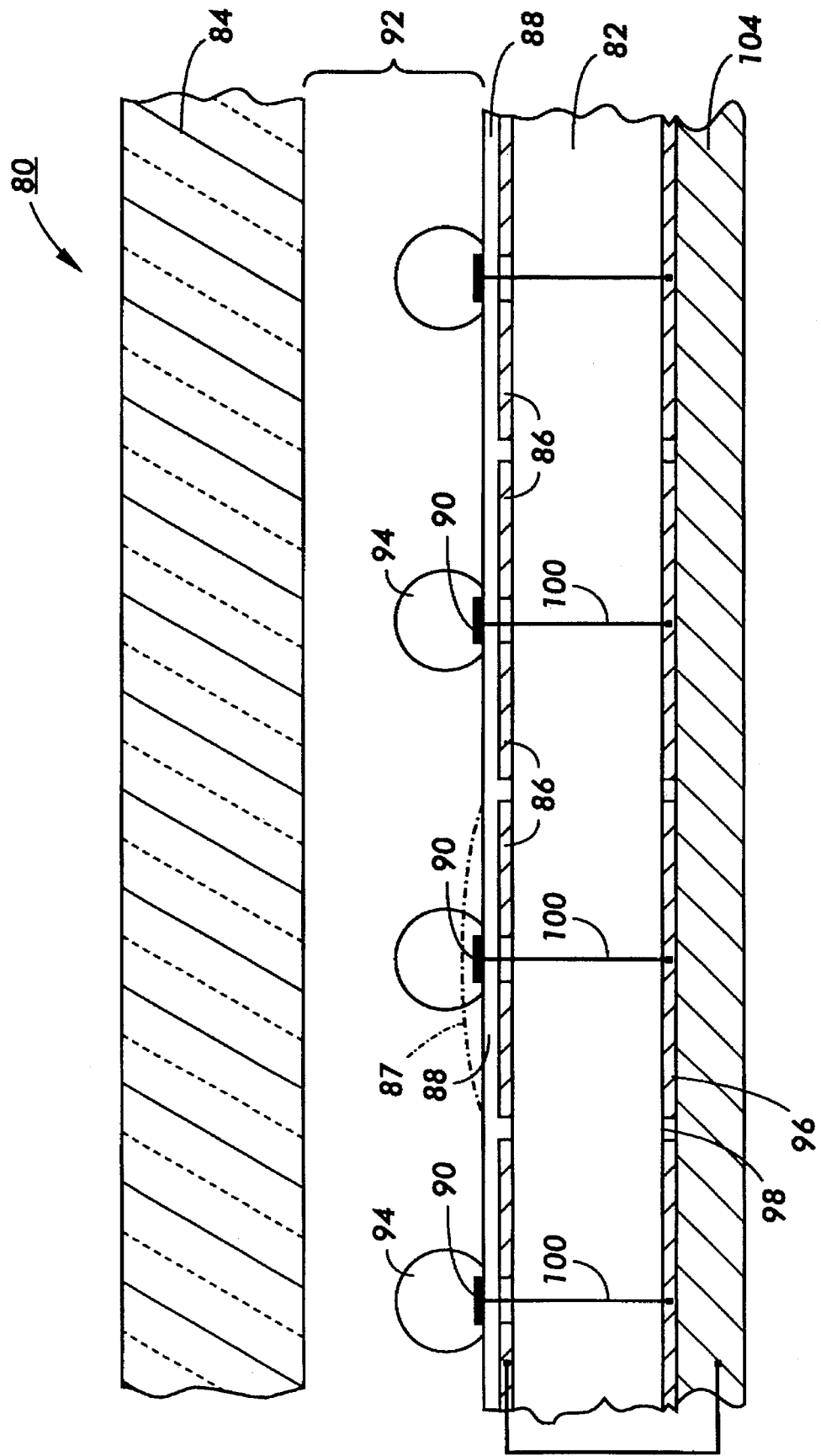
FIG. 12 shows how the display sheet of FIG. 11 is erased.

Referring to FIG. 12, the erasure of the image of FIG. 11 is accomplished by replacing the stylus by a broad contact area electrode 104 that would be preferably soft, such as a conductive brush. The broad contact area electrode 104 has to be connected to all the electrodes 86. For the purpose of simplicity only the connection of one of the electrodes 86 to the broad contact area electrode 104 is shown. Then, by placing the broad contact area electrode 106 on surface 98, the electrodes 86 and the connection plates 90 will be shorted together causing the droplets to move back into their original shape and causing the image to be erased.

Figure 13:
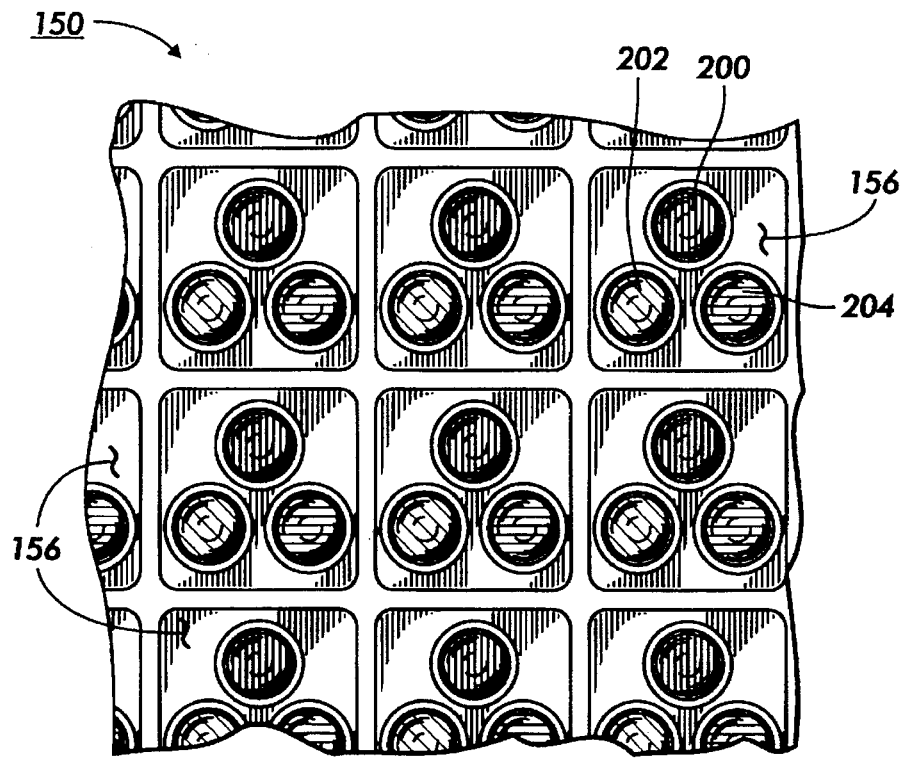
FIG. 13 shows a portion of the top view of the electrocapillary color display sheet of this invention.

The electrocapillary display sheet of this invention can be modified to display full color images. Referring to FIG. 13, there is shown a portion of the top view of the electrocapillary color display sheet 150 of this invention. In FIG. 13, the sizes of the electrodes 156 are the same as the size of a pixel.

Figure 14:
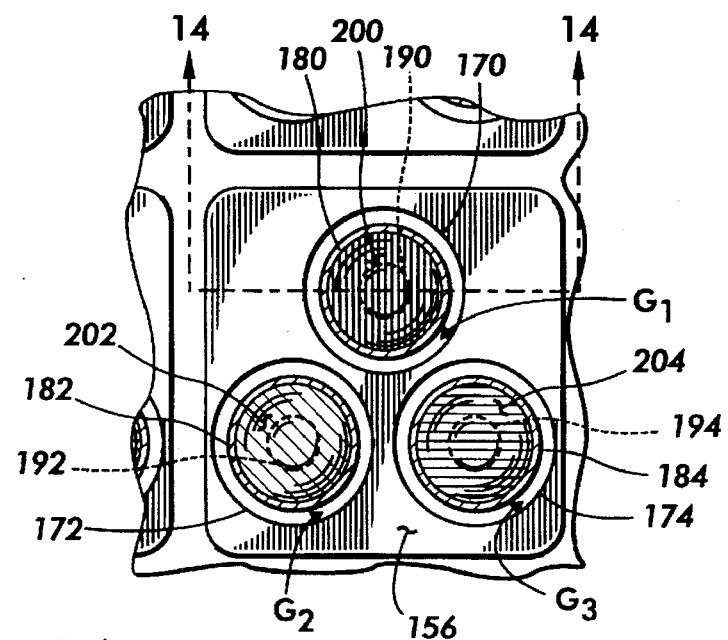
FIG. 14 shows a magnified view of the electrocapillary color display sheet of FIG. 13 where only one of the electrodes 156 is fully shown.
Figure 15:
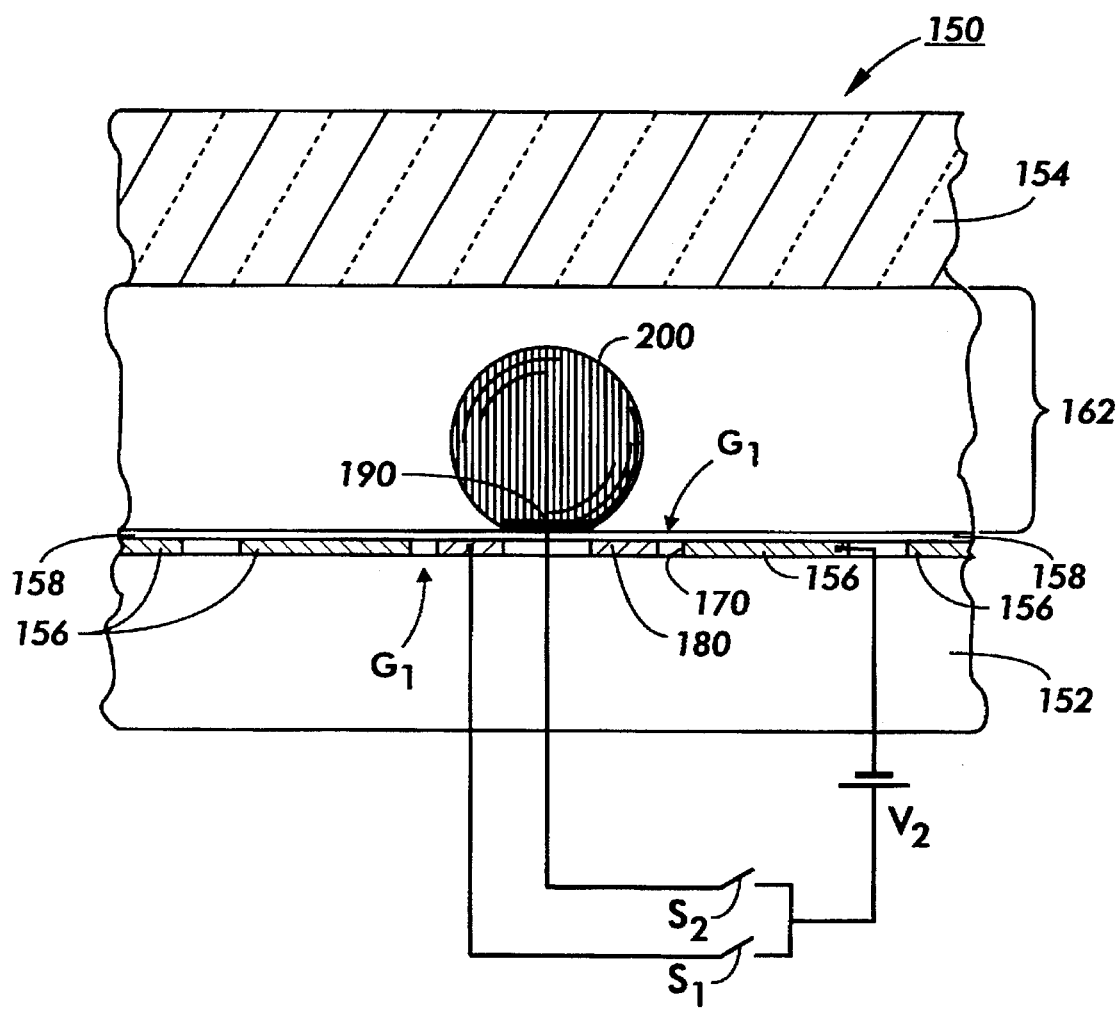
FIG. 15 shows a cross sectional view of the electrocapillary color display of FIG. 14 along line A—A.

Referring to FIG. 14, there is shown a magnified view of the electrocapillary color display sheet 150 of FIG. 13 where only one of the electrodes 156 is fully shown. Referring to FIG. 15 there is shown a cross sectional view across line A—A of FIG. 14. In FIG. 15, elements 152, 154 and 162 are the same and serve the same purpose as the elements 12, 14 and 22 of FIG. 1. In FIG. 15, electrodes 156 are similar and they serve the same purpose as the electrodes 16 of FIG. 1, except electrodes 156 are not solid squares. Referring to both FIGS. 14 and 15, each electrode 156 has three holes 170, 172 and 174. In each hole there exists an electrode in the shape of a ring. Hole 170 has a ring electrode 180, hole 172 has a ring electrode 182 and hole 174 has a ring electrode 184.

It should be noted that in the preferred embodiment of this invention, the holes 170, 172 and 174 are shown as circular holes and the ring electrodes 180, 182 and 184 are shown as circular rings. However, any shape hole can replace the holes 170, 172 and 174. Also, the ring electrodes 180, 182 and 184 do not need to be ring shaped electrodes. They can be full circles or they can have any shape.

Similar to the display sheet 10 of FIG. 1, over the substrate 152, the electrodes 156 and the ring electrodes 180, 182 and 184 there is a layer of low surface energy insulator 158. Over the surface energy insulator layer 158 for each electrode 156 there are three connection plates 190, 192 and 194 each of which is placed within the perimeter of the inner circle of one ring electrodes 180, 182 and 184 respectively.

Three droplets 200, 202 and 204 are placed over the connection plates 190, 192 and 194 of each electrode 156 in such a manner that each covers one of the connection plates 190, 192 and 194 respectively and each droplet has a different color. Red, green and blue are the colors of the droplets 200, 202 and 204 respectively. However, the order in which the droplets cover the connection plates is immaterial. It should be noted that each droplet is droplet of a dyed or pigmented liquid.

Each one of the connection plates 190, 192 and 194 provides an electrical connection to one of the droplets 200, 202 and 204 respectively. The electrode 156, the ring electrodes 180, 182 and 184 and the connection plates 190, 192 and 194 are connected to a voltage source generating voltage $V_2$. The voltage $V_2$ can be either AC or DC. In FIG. 14, voltage $V_2$ is shown as a DC voltage. One polarity/terminal of the voltage $V_2$ has to be connected to electrode 156. The same polarity/terminal of the voltage $V_2$ has to be connected to the ring electrodes 180, 182 and 184 through individual switches. For example, in FIG. 15, the ring electrode 180 is connected to voltage $V_2$ through switch $S_1$. The opposite polarity/terminal of the voltage $V_2$ has to be connected to the connection plates 190, 192 and 194 through individual switches. For example, in FIG. 15, the connection plate 190 is connected to voltage $V_2$ through switch $S_2$. Since the connection plates 180, 182 and 184 provide electrical connection to the droplets 200, 202 and 204, the droplets 200, 202 and 204 will have the opposite potential compared to the potential of the electrode 156.

In operation, to cause a droplet to expand, electrode 156, the corresponding ring electrode and the corresponding connection plate have to be activated. For example, to cause the droplet 200 to expand, electrode 156, the ring electrode 180 and the connection plate 190 have to be activated.

Therefore, when one of the switches for the connection plates is closed, the corresponding switch for the ring electrodes also have to be closed. For example, in order to cause droplet 200 to expand, switch $S_1$ and switch $S_2$ have to be closed. Once the switches $S_1$ and $S_2$ are closed, the ring electrode 180 will have the same potential as electrode 156 and the connection plate 190 will have the opposite potential to the potential of the electrode 156. This will cause the droplet 200 to expand and cross the gap $G_1$ between the electrode 156 and the ring electrode 180. Once, the droplet 200 passes the gap $G_1$, it will expand and cover the entire electrode 156. However, since the ring electrodes 182 and 184 are not activated, the expanded droplet 200 will stop at the gaps $G_2$ and $G_3$ and does not cross the gaps $G_2$ and $G_3$.

In order to contract the droplet 200, first switch $S_2$ has to be opened to disconnect the electrical connection of the connection plate 190. This will cause the droplet to contract. However, switch $S_1$ has to be kept closed in order to allow the droplet 200 to cross the gap $G_1$ and contract back onto the connection plate 190. Once the droplet 200 is completely contracted, the switch $S_1$ of the ring electrode 180 will be opened.

The same procedure is applied to the other droplets to expand and contract each droplet.

The disclosed embodiment of FIGS. 13–15 is designed for miscible liquids. The gaps are designed to prevent each droplet from crossing over to the boundaries of the other droplets. As a result, only one droplet can be expanded at each given time. In this approach, each pixel can have only the color of one of the droplets at any given time.

In the electrocapillary color display sheet 150 of FIG. 15, switches are used to selectively activate the ring electrodes 180, 182 and 184 and the connection plates 190, 192 and 194 respectively. However, any addressable design which can provide individual electrical connections to the ring electrodes 180, 182 and 184 and the connection plates 190, 192 and 194 can replace the disclosed switches of this embodiment.

It should be noted that the color capacitive energy display sheet disclosed in this specification can also utilize the disclosed embodiment 60 of FIG. 10.

It should also be noted that in the color electrocapillary display sheet of this invention, the red, blue and green liquids can be replaced by any three complementary colors which can create the spectrum of colors.

It should further be noted that numerous changes in details of construction and the combination and arrangement of elements and materials may be resorted to without departing from the hue spirit and scope of the invention as hereinafter claimed.

I claim:

1. A color display device comprising:
    a first sheet;
    a second sheet;
    said first sheet having an outer surface and an inner surface;
    said second sheet having an outer surface and an inner surface;
    a sealed space between said inner surface of first sheet and said inner surface of said second sheet;
    said first sheet having a first type electrode means on said inner surface;
    said first type electrode means having at least two holes;
    each of said at least two holes of said first type electrode means housing a second type electrode means;
    an insulating layer;
    said insulating layer being located over said first type electrode means and said second type electrode means;
    at least two third type electrode means being located over said insulating layer and each being aligned to be within the perimeter of one of said second type electrode means and being exposed to said sealed space;
    said insulating layer being so constructed and arranged to insulate said at least two third type electrode means from said first type electrode means and said second type electrode means;
    a droplet of a first color liquid;
    a droplet of a second color liquid;
    said droplet of said first color liquid being located in said sealed space covering one of said at least two third type electrode means;
    said droplet of said second color liquid being located in said sealed space covering the other one of said at least two third type electrode means;
    first means for activating said first type electrode means;
    means for activating said one of said at least two third type electrode means;
    means for activating said other electrode means of said at least two third type electrode means;
    means for activating one of said second type electrode means;
    means for activating the other one of said second type electrode means; and
    said first type electrode means, said second type electrode means and said at least two third type electrode means being so constructed and arranged relative to each other and to said droplet of first color and said droplet of said second color that when said first type electrode means, said one of said second type electrode means and said one of said at least two third type electrode means are activated, said droplet of first color liquid will expand, when said first type electrode means, said other one of said second type electrode means and said other one of said at least two third type electrode means are activated, said droplet of second color liquid will expand.

2. A color display device comprising:
    a first sheet;
    a second sheet;
    said first sheet having an outer surface and an inner surface;
    said second sheet having an outer surface and an inner surface;
    a sealed space between said inner surface of first sheet and said inner surface of said second sheet;
    said first sheet having a plurality of first type electrode means on said inner surface;
    each one of said first type electrode means having at least two holes;
    each one of said at least two holes of said plurality of first type electrode means housing a second type electrode means;
    an insulating layer;
    said insulating layer being located over said plurality of first type electrode means and said second type electrode means in said at least two holes of each first type electrode means of said plurality of first type electrode means;

a plurality of sets of at least two third type electrode means being located over said insulating layer, each set of third type electrode means corresponding to one of said plurality of first type electrode means;

each electrode means of each set of said plurality of sets of at least two third type electrode means being aligned to be within the perimeter of said second type electrode means and being exposed to said sealed space;

said insulating layer being so constructed and arranged to insulate said plurality of sets of at least two third type electrode means from said plurality of first type electrode means and said plurality of said second type electrode means;

a plurality of droplets of a first color liquid;

a plurality of droplets of a second color liquid;

each of said droplets of said first color liquid being located in said sealed space covering one electrode means of a set of said plurality of sets of at least two third type electrode means;

said droplet of said second color liquid being located in said sealed space covering the other electrode means of said set of said plurality of sets of at least two third type electrode means;

first means for selectively activating said plurality of first type electrode means;

means for selectively activating one electrode means of each set of said plurality of at least two third type electrode means;

means for selectively activating the other electrode means of each set of said plurality of at least two third type electrode means;

means for selectively activating each second type electrode means; and said plurality of first type electrode means, said plurality of second type electrode means and said plurality of sets of at least two third type electrode means being so constructed and arranged relative to each other and to said plurality of droplets of first color and said plurality of droplets of said second color that when one of said plurality of first type electrode means, a corresponding one of said second type electrode means and a corresponding one of said at least two third type electrode means are activated, a corresponding droplet of said plurality of droplets of first color liquid will expand, when one of said plurality of first type electrode means, a corresponding other one of said second type electrode means and a corresponding other one of said set of said at least plurality of at least two third type electrode means are activated, said droplet of second color liquid will expand.

* * * * *